United States Patent [19]

Finkel

[11] Patent Number: 4,664,927
[45] Date of Patent: May 12, 1987

[54] CHOCOLATE COMPOSITIONS OF INCREASED VISCOSITY AND METHOD FOR PREPARING SUCH COMPOSITIONS

[76] Inventor: Gilbert Finkel, 6 Jagged Rock Rd., Parsippany, N.J. 07054

[21] Appl. No.: 751,056

[22] Filed: Jul. 2, 1985

Related U.S. Application Data

[63] Continuation-in-part of Ser. No. 633,529, Jul. 23, 1984, abandoned.

[51] Int. Cl.$^4$ ............................................. A23G 1/00
[52] U.S. Cl. .................................. 426/330; 426/330.6; 426/613; 426/660
[58] Field of Search ..................... 426/330.6, 548, 589, 426/601, 609, 610, 613, 804, 660

[56] References Cited

U.S. PATENT DOCUMENTS 2,904,438  9/1959  O'Rourke ...................... 426/660 X
3,023,104  2/1962  Battista .......................... 426/802 X
3,935,319  1/1976  Howard ......................... 426/802 X
3,995,068  11/1976 Billerbeck et al. ................ 426/633
4,062,986  12/1977 Billerbeck et al. ................ 426/633
4,145,452  3/1979  Cousin et al. .................... 426/601 X
4,420,496  12/1983 Hanson, Jr. et al. .............. 426/609
4,464,411  8/1984  Herzing et al. ................... 426/613

FOREIGN PATENT DOCUMENTS 979730 12/1975 Canada .

OTHER PUBLICATIONS

Minifig, B. W., "Chocolate, Cocoa and Confectionery", Avi Publ. Co., Inc., Westport, Conn., 1980, p. 139.

Primary Examiner—Robert Yoncoskie
Attorney, Agent, or Firm—Norman E. Lehrer

[57] ABSTRACT

The addition of a polyol, such as glycerine or sorbitol, to a system containing a low melting point fat or oil greatly increases the viscosity of the fat or oil thereby immobilizing it even at temperatures which are well above its normal melting point. When a polyol is added to chocolate, the resulting product does not stick to wrappers or fingers even at elevated temperatures where the cocoa butter in the chocolate would normally flow.

11 Claims, No Drawings

CHOCOLATE COMPOSITIONS OF INCREASED VISCOSITY AND METHOD FOR PREPARING SUCH COMPOSITIONS

This application is a continuation-in-part of application Ser. No. 633,529, filed July 23, 1984 now abandoned.

The present invention relates to a method of increasing the viscosity of a fat or oil and to the product produced by that method. More particularly, this invention is directed to a technique for immobilizing the normally flowable fats or oils in systems containing these materials so that they remain substantially non-flowable even at temperatures which are above their normal melting point.

Fats and oils are widely used in food, cosmetic and pharmaceutical products. Unfortunately, many naturally occurring oils and some fats have very low melting (flow) points and, therefore, impart an undesired physical characteristic to products which contain them. The separation of peanut oil in peanut butter is one typical example of the problem. Another example is the tendency of natural chocolate products containing cocoa butter to stick to product wrappers or to fingers, particularly during the summer months. The separation of butter from dough in the preparation of dough for pastry products, such as croissants or danish pastry, and the surface greasiness of such products is yet another example of an adverse product characteristic resulting from the low melting and flow point of a fat-containing product.

Oils and fats can be immobilized by hydrogenation but this approach is expensive and leads to physiological properties which may be undersirable in food products. Hard fats may be substituted for oils or lower melting point fats, but this substitution often changes the texture or other eating characteristics of the product. Immobilization of fats may also be achieved by the use of stabilizers. However, such additivies are often expensive and may be comprised of undesirable synthetic materials. Moreover, there is a consumer trend away from food products which contain unnatural additives. In addition, in the case of some products, such as chocolate, the addition of a stabilizer may constitute a material departure from the standard of identity for "chocolate", thereby depriving a manufacturer of the ability to call a particular product a "chocolate" product.

Canadian Pat. No. 979,730 discloses one attempt in the prior art to overcome the undesirable effect of a low melting point in a fat or oil containing system by the incorporation of colloidal silicone dioxide having a defined particle size. As described in the aforesaid patent, the oil is heated and intimately mixed with the silicone dioxide particles using high shear mixing. Thereafter, a polyol bridging compound is added in order to bind the oil in a stable matrix formed by the silicone dioxide particles and the polyol. The resulting product is a shortening which has a thick-spreading consistency and exhibits little change in viscosity at elevated temperatures. The undesirability of adding silicone dioxide particles to food products is believed to be self-evident.

Attempts have been made to produce a heat-resistant chocolate by incorporating crystalline hydrophillic substances such as dextrose, maltose, mannitol or sorbitol as humectants and exposing the chocolate, after casting, to a moist atmosphere for an extended period of time. See, for example, U.S. Pat. No. 4,446,166. The products of that process have an undesirable surface appearance as a result of sugar bloom, and the flowability of the fat immediately below the surface of the chocolate is not altered by the treatment.

Various types of polyols such as glycerine, sorbitol, mannitol and propylene glycol have been employed in liquid, semisolid or solid food applications as bodying agents, humectants, anti-oxidants, preservatives, solubilizing agents and the like. For example, Japanese Patent Application No. 50-96979 discloses the preparation of fat and oil compositions containing high HLB emulsifiers and inter alia, polyols, as solubilizers. U.S. Pat. No. 3,694,233 discloses gravy compositions with high water and oil content, which contains between 9 and 66% by weight of glycerol or a preservative. Polyols are also disclosed as preservatives to reduce spoilage in U.S. Pat. No. 4,252,834. However, until now the prior art has not recognized that polyols have the ability to dramatically increase the viscosity of fats and oils.

It is an object of the present invention to provide a novel method for immobilizing the fat or oil in products containing such materials.

Yet another object of the invention is to provide food products in which normally flowable fats and oils are immobilized at temperatures well above their normal flow points.

A further object of the invention is to provide novel chocolate products which do not flow at summertime conditions.

It has now been discovered that the addition of a liquid polyol to a fat or oil-containing system results in a substantial increase in the viscosity of the fat or oil. This increase in viscosity, once achieved, appears to be unaffected by increases in the temperature of the fat, even though the temperature reaches levels well above the normal melting point of the particular fat or oil. In its preferred form, the invention is direct to fat-containing systems which initially have a high viscosity and marginal flowability as a result of a relatively high solids content. In such systems, the increase in viscosity caused by the present invention is such that the fats appear to be substantially immobilized, and the resulting products exhibit the appearance and characteristics of a solid, even at temperatures which are well above the melting point of the fat component of the system. Thus, chocolate will appear to be unmelted and will not stick to wrappers or fingers, even though the chocolate is at a temperature well above the flow point of the cocoa butter contained in the chocolate. Similarly, the addition of a polyol to peanut butter is sufficient to retard the typical separation of the product into its solid and oil components.

The exact mechanism by which the increase in viscosity and immobilization of the fat or oil are achieved is not known. However, it is presently believed that the increased viscosity is due to some type of chemical interaction between the fat and the polyol. This belief stems from the fact that, after the addition of the polyol, the viscosity of the fat-containing system appears to increase with increasing time and/or temperature and, up to a point, by increasing the amount of polyol added. Moreover, after cooling, the increased viscosity appears to be unaffected by increases in temperature which are substantially above both the temperature at which the polyol was initially added as well as the melting point of the fat. Further, in order to achieve the desired increase in viscosity, the polyol must either be a liquid or be in solution when mixed with the fat or oil. All of the foregoing characteristics are consistent with the possibility of a chemical reaction between the fat and the polyol.

Any fat or oil may be utilized to form the novel products of the invention. Ordinarily, the fats and oils are of animal or vegetable origin and are edible. However, synthetic materials having substantially similar chemical compositions to fats and oils may also be used. The preferred fats and oils are lower melting point fats which exhibit some tendency to flow at ambient or slightly elevated temperatures. This would include cocoa butter, other butter products, peanut oil, and vegetable oils. However, substantially any fat or oil can be converted to a significantly higher viscosity product by virtue of the present invention.

In a preferred embodiment, the invention is particularly applicable to products containing low melting point fats or oils which also contain a substantial amount of solids suspended therein, e.g., at least 20 wt. % and preferably 30 wt. % and as much as 50 wt. % or more of suspended solids. Typical materials of the foregoing type include chocolate which contains milk solids, peanut butter which contain peanut solids, and pastry doughs which contain flour or other starch materials. When a polyol is added to such a marginally flowable system containing a substantial proportion of solids, the resulting increase in viscosity produces a system in which the fat or oil is substantially non-flowable and, for practical purposes, behaves like a solid even though the temperature of the fat-containing system is raised to a level where the fat is actually a liquid, albeit a highly viscous liquid.

Polyols which may be used in the invention are straight or branched chained hydrocarbon compounds containing at least two hydroxyl groups on the carbon skeleton. Compounds which include other functional groups, e.g., double bonds or carboxyl groups, may also be employed, provided that at least two hydroxyl groups are also present. There is no upper limit to the number of carbon atoms or hydroxyl groups which may be present on the structure. Polyols are not generally soluble in fats or oils and it is a critical feature of the invention that the polyol be in a liquid form when it is mixed with the fat. Accordingly, polyols which are naturally occurring liquids, such as glycerine, are preferred as a matter of convenience, although other polyol materials which readily form solutions having a substantial concentration of the polyol are acceptable. For example, sorbitol is commercially available as a 70% solution in water. Other materials which can be utilized in the invention include propylene glycol, mannitol, corn syrup (e.g., 42 D.E.), or a hydrogenated corn syrup, such as the mixture commercially available under the trademark LYCASIN which comprises sorbitol and a variety of hydrogenated polysaccharide compounds.

Ordinarily, the amount of polyol added to the system will be between 0.2 and 5 wt. %, preferably 0.5 and 2 wt. %. At low polyol levels, an increase in the amount of polyol results in some increase in the viscosity of a fat-containing system, but this effect does not continue at higher polyol levels. Moreover, there appears to be a direct relationship between the amount of fat present in a system and the amount of polyol which will be useful in producing an increased viscosity.

No special mixing conditions are required to form the novel products of the invention. However, it is apparent that the polyol must be in liquid form and be homogeneously dispersed in the fat-containing system. To this end, the fat or oil containing system must be in a somewhat flowable form when the polyol is added. Increased flowability may be achieved by mixing the fat-containing material with the polyol at a slightly elevated temperature, e.g., 75°–120° F. It has also been observed that the time required to achieve the increased viscosity directly varies with the temperature of the mixture. Irrespective of the temperature, however, it may be desirable to hold the mixture of the polyol and fat-containing material in storage for periods of time ranging from about 5 minutes to 60 minutes or more in order to reach a desired viscosity level before further using or processing the material. The length of time the product is held will, of course, depend on the specific nature of the product and the further proceeding steps. In those instances where a greatly increased viscosity would hinder the formation of the first product, the products may be rapidly formed after addition of the polyol and, thereafter, be held at conditions which would favor a further increase in viscosity.

A particularly preferred application of the invention is the formation of chocolate products which will remain relatively hard at elevated temperatures where the fat (cocoa butter) content of chocolate normally flows. At the average temperature of human skin (91° F.), the fat content of chocolate is soft and flowable, which serves to explain why a piece of chocolate normally sticks to a person's fingers if it is held for any significant length of time. Chocolate also sticks to wrappers at summer temperatures. If the fat content of the chocolate is immobilized by the addition of a polyol, it will not flow even at temperatures well above 91° F.

In a typical process for manufacturing chocolate or chocolate coated products in accordance with the invention, any conventional chocolate formulation may be employed. Such formulations normally contain chocolate liquor, whole milk solids, sugar and, most importantly, cocoa butter. However, any other ingredients, all of which are well known in the art, may also be used. Typically, the foregoing ingredients are mixed, refined, conched and standardized as to viscosity and are thereafter tempered by heating to an elevated temperature, e.g., 120° F., cooled to a lower temperature, e.g., 79° F. and reheated to a molding or enrobing temperature of about 85° F. The chocolate is then utilized to form a molded finished product or to enrobe or coat a pre-formed center. In either event, the chocolate is eventually cooled or refrigerated after it is put into the final product form.

In accordance with the present invention, 0.2 to 5 wt. % of a liquid polyol, e.g., glycerine, is added to the flowable chocolate mixture after it is tempered and before it is molded or used as an enrobing material. The liquid polyol is mixed with the chocolate at a temperature in the range of 75° to 95° F., preferably, 84° to 91° F. and held at that temperature for a period of 1 to 60 minutes, e.g., 8 minutes. Alternatively, the chocolate may be immediately used after addition of the polyol, provided that it is held at the molding or enrobing temperature for a time sufficient to permit the fat and polyol to interact and produce an increase in viscosity before it is refrigerated for demolding. The length of the holding time is a matter of choice based upon the fat content of the particular formulation being employed, the amount of polyol, the temperature, and the fluidity or viscosity requirements needed for efficient processing of the chocolate to form the desired end products. However, because the increase in viscosity which results from the practice of the invention is heat irreversible, it is important that careful attention be paid to the holding time and temperature so as to ensure that the desired increase in viscosity is obtained without interfering with the ability to process the chocolate into finished products.

The invention will be further understood from the following illustrative examples:

EXAMPLE 1

In initial tests with cottonseed oil, an oil containing substantially no suspended solids, the addition of 1% sorbitol in liquid form raised the Brookfield Viscometer reading by approximately 100% for a given rate of revolution of the viscometer disk.

EXAMPLE 2

The results obtained with semisweet chocolate and 1% polyol are shown in Table 1 below (maximum scale reading is 100).

TABLE 1

| Speed | Control (Spindle 3) | With 1% Glycerine (Spindle 5) |
|---|---|---|
| 1 | 26.8 | off scale |
| 2 | 38.5 | off scale |
| 5 | 41.0 | off scale |
| 10 | 54.0 | off scale |

EXAMPLE 3

The polyols seemingly effect fat crystal growth. The viscosity of a fat/oil system consisting of 2 parts of soybean oil and 1 part of partially hydrogenated cottonseed oil at 85° F. was 384 cps., as measured on a Brookfield Viscometer. The viscosity increased to 512 cps. after addition of 1.5 wt. % glycerine. When the fat-containing glycerine was cooled to 75° F., the viscosity increased to 640 cps. When the temperature was raised to 85° F., the viscosity remained unchanged at 640 cps., thereby demonstrating that the increase in viscosity is heat irreversible.

In similar experiments utilizing a 5 ml. Ostwold pipette, 1 wt. % of LYCASIN, Polyol 6075 (manufactured by LONZA), a partially hydrogenated corn syrup, propylene glycol, and glycerine with a mixture of 1 part vegetable oil and 9 parts partially hydrogenated cottonseed oil, the following flow rates were observed:

| Control (No Polyol) | 4 min. 17 sec. |
|---|---|
| Propylene Glycol | 4 min. 30 sec. |
| Glycerine | 4 min. 40 sec. |
| LYCASIN | 4 min. 44 sec. |
| POLYOL 6075 | 5 min 32 sec. |

EXAMPLE 4

A chocolate was prepared to the following formula:

| Ingredient | Parts by Weight |
|---|---|
| Chocolate liquor | 10.50 |
| Whole milk solids | 22.95 |
| Sugar | 45.0 |
| Cocoa butter | 21.00 |
| Vanillin | 0.05 |

-continued

| Ingredient | Parts by Weight |
|---|---|
| Glycerine | 1.00 |

The above material was mixed in a 5 qt. Hobart mixer for 5 minutes. The mixed material was refined by running it through a 3 roll laboratory refiner (a horizontal 3 roll mill) where the particle size was reduced to approximately 22 microns. Thereafter the chocolate was conched by mixing in a 5 quart Hobart mixer for 5 hours with a heat gun blowing on the mix. The conching temperature was 135° F. The chocolate prepared as described above was tempered by heating to 120° F., cooling to 79° F., and reheating to 84.5° F.

One part of glycerine was added to tempered chocolate prepared in the foregoing manner and stirred vigorously while being held at 84.5° F. for a period of ten minutes. Thereafter, the chocolate was poured into one ounce molds which were being vibrated during the molding process. The chocolate in the molds was refrigerated for thirty minutes and then demolded.

When chocolate pieces prepared in the foregoing manner are heated with a heat gun at 120° F., the pieces soften slightly but do not become fluid. In contrast, chocolate pieces prepared from the same formulation without glycerine are more or less fluid and flow at the elevated temperature.

In a separate experiment, a chocolate formulation is prepared using the method and formulation described above, except that 10 parts of dextrose are substituted for 10 parts of sucrose, no glycerine is added, and the molded bars are stored for 21 days at 85° F. and 85% relative humidity, as described in U.S. Pat. No. 2,904,438. When chocolate bars prepared in that fashion are heated to 120° F., the presence of a heat resistant skin on the surface of the chocolate is noted, but the chocolate beneath the skin is flowable.

EXAMPLE 5

Imitation chocolate may also be formed in accordance with the invention. In such products, the amount of cocoa butter is greatly reduced and hard butter is substituted. A typical formulation is as follows:

| Ingredient | Parts by Weight |
|---|---|
| Cocoa | 5.40 |
| Non-fat dry milk | 16.50 |
| Sugar | 45.00 |
| Hard butter | 32.05 |
| Vanillin | 0.05 |

The foregoing ingredients are mixed and refined, as previously described, and heated to 120° F. One part of glycerine is then added. The imitation chocolate is cooled to 85° F. and is used as an enrobing agent for previously prepared centers. The chocolate coating does not stick to the fingers.

EXAMPLE 6

Conventional peanut butter may comprise ground peanuts with a composition of about 45 to 50% by weight of fats and oils and 50 to 55% by weight of nut solids. Sugar and salt are added to taste. The natural peanut butter produced by blending of the peanuts separates rapidly into oil and solids portions on standing, even under refrigeration. Glycerine (0.5% by weight) is added to the natural peanut butter and mixed in a conventional mixer. Separation of the oil from the solids no longer occurs.

EXAMPLE 7

The following ingredients are blended at 85° F.:

| Ingredient | Parts by Weight |
|---|---|
| Butter | 82.50 |
| Flour | 15.00 |
| Glycerine | 2.50 |

The material is used as a shortening in a normal manner for danish pastry, croissants, puff pastry and the like. As compared to conventional shortening, the butter does not separate from the dough during processing to form the pastry products even when the formed but unbaked products are held on trays for extended periods of time prior to baking.

Heretofore, solid pharmaceutical compositions for oral administration have been made available in two major forms, capsules containing powders and tablets. Tablets are produced by compounding the pharmaceutically active agent with lactose, talc and several other excipients which contribute to the cohesion of the tablet under the conventional process of compression and also permit its release from the compression mold.

It is well known to those skilled in the art that providing the correct ratio of these components can be a difficult problem, particularly for those tablets which require a high proportion of the pharmaceutically active components particularly where the physical nature of the active component does not lend itself readily to the tableting process. It would be extremely desirable therefore to be able to compound these materials in a pharmaceutically acceptable composition which has temperature stability and is readily absorbed into the physiological system. Natural oils and fats would be desirable carriers but unfortunately, most of them have melting points which are far too low for practical purposes, i.e., maintaining the integrity of the tablet at ambient temperatures on the order of 100° F.

The procedures of the present invention provide a ready and simple solution to the problem. The pharmaceutically active composition is compounded with a natural occurring fat or oil and a polyol. As stated above, the high proportion of solid material (in this case pharmaceutically active) which causes problems in the conventional tableting process, is in fact advantageous in the composition of the present invention. The fat/-polyol-active compound composition is flowed into molds which are under vibration; the vibration is then ceased and the now temperature-stable tablets can be readily removed from the mold.

If it is desirable to further ensure the integrity and non-mutual adhesion of the tablets by coating them with sugar or similar glazes in a conventional manner, this may be readily done.

EXAMPLE 8

An antacid tablet formula is prepared from the following formulations:

| Ingredient | % by weight |
|---|---|
| Partially Hydrogenated vegetable oil | 40.00 |
| Calcium carbonate | 35.00 |
| Sugar | 21.75 |
| Simethacone | 1.50 |
| Glycerine | 1.50 |
| Flavoring | 88.25 |
| | 100.00 |

The components are mixed in the conventional manner, heated to about 10° F. above their flow point, poured into tableting molds of predetermined shape and permitted to set. In one embodiment, half molds having a raised lip may be used and a second half mold placed thereon while the components are still in liquid form. Conventional measures for removal of displaced air should be taken to ensure desired form.

It will be readily apparent to those skilled in the art that a wide variety of food, cosmetic, pharmaceutical or other compositions can be formualted utilizing the method of the invention to produce a variety of novel products which may benefit from the ability to immobilize a low melting point fat or oil.

What is claimed is:

1. A method of increasing the viscosity of a chocolate composition containing cocoa butter so that said composition will be substantially non-flowable at a temperature above its normal melting point comprising adding 0.2 to 5 wt. % of a liquid polyol to a flowable chocolate mixture after it has been tempered.

2. The method of claim 1 wherein said liquid polyol is a solution containing said polyol.

3. The method of claim 1 wherein said polyol is glycerine.

4. The method of claim 1 wherein said composition contains at least 20 wt. % of solid particles.

5. The method of claim 1 further including the steps of maintaining the temperature of the chocolate composition including the polyol at a temperature at which said composition is flowable for a time sufficient to permit said cocoa butter and polyol to interact and produce an increase in viscosity and thereafter cooling said composition to form a solid chocolate composition product.

6. The method of claim 5 wherein said time is between 1 and 60 minutes.

7. The method of claim 6 wherein said time is 8 minutes.

8. The method of claim 1 wherein said liquid polyol is added to said chocolate mixture when said mixture is at a temperature above about 75° F.

9. The method of claim 8 wherein said temperature is between approximately 75° to 95° F.

10. The method of claim 9 wherein said temperature is between approximately 84° to 91° F.

11. A chocolate composition produced in accordance with the method of claim 1.

* * * * *